May 5, 1925.

W. N. BOOTH

DEMOUNTABLE RIM

Filed Aug. 27, 1921

Inventor
William N. Booth

By Whittemore Hulbert Whittemore
+Belknap    Attorneys

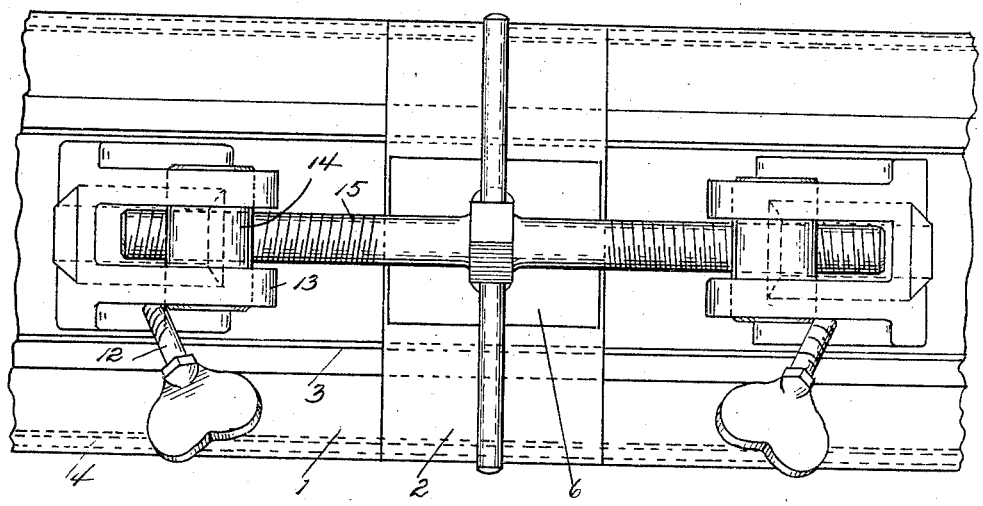
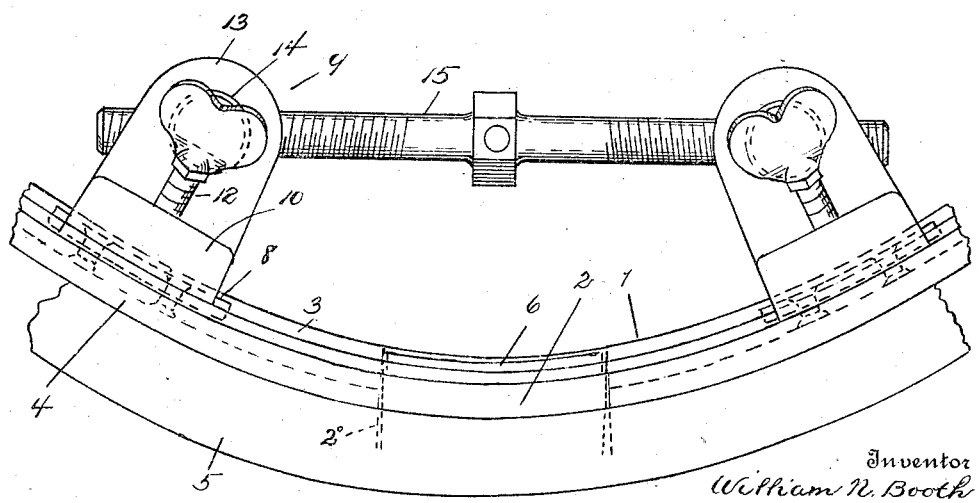

Patented May 5, 1925.

1,536,372

UNITED STATES PATENT OFFICE.

WILLIAM N. BOOTH, OF DETROIT, MICHIGAN.

DEMOUNTABLE RIM.

Application filed August 27, 1921. Serial No. 495,930.

*To all whom it may concern:*

Be it known that I, WILLIAM N. BOOTH, a citizen of the United States of America, residing at Detroit, in the county of Wayne and State of Michigan, have invented certain new and useful Improvements in Demountable Rims, of which the following is a specification, reference being had therein to the accompanying drawings.

The invention relates to demountable rims and is designed particularly for use with the larger sized pneumatic tires for trucks and the like. The object of the invention is the provision of a demountable rim which is simple and reliable and which is so constructed that a tire can be readily applied or removed. Other objects are the provision of means upon the main section of the demountable rim for detachably engaging a tool for expanding and contracting the main section; and also the provision of means upon the filler section of the demountable rim for preventing the creeping of the demountable rim upon the fixed rim of the vehicle wheel. Further objects of the invention reside in the novel features of construction as more fully hereinafter set forth.

In the drawings:

Figure 2 is a side elevation of a portion of the demountable rim and showing an expanding and contracting tool in operative position;

Figure 3 is a plan view thereof;

Figure 1:
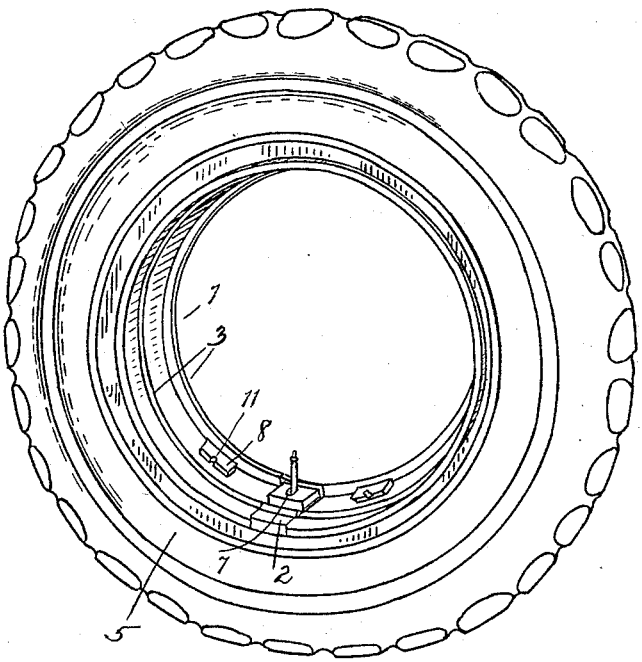
Figure 1 is a perspective view of a demountable rim embodying my invention and showing a pneumatic tire in place.
Figure 4:
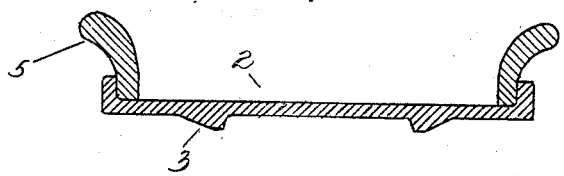
Figure 4 is a cross section therethrough.

The demountable rim comprises the transversely split main section 1 and the filler section 2 fitting between the ends of the main section. Both the main and filler sections have upon their inner peripheries the pair of registering beads 3 adapted to seat upon the fixed rim of the vehicle wheel and the side flanges 4 adapted to engage the tire retaining rings 5.

In order to normally retain the filler section 2 from radial inward movement when fitting between the ends of the main section, 1, the cooperating end bearing surfaces of the filler and main sections slightly diverge outwardly relative to lines passing through the bearing surfaces and extending parallel to the radius of the rim passing through the peripheral center of the filler section this divergence at each end being approximately two degrees in the present instance. The filler section has the inwardly projecting portion 6 located between the beads and adapted to engage suitable driving lugs or the like upon the fixed rim of the vehicle wheel whereby creeping of the demountable rim upon the fixed rim is prevented. There is also the elongated aperture 7 in the filler section and extending transversely of the rim for the passage of the air valve of the inner tube so that when the filler section has been removed from between the ends of the main section, the latter can be contracted to bring its ends adjacent to the air valve at which time the diameter of the main section is reduced sufficiently to permit of passing the tire retaining rings 5 over the side flanges 4 of the main section and afterwards removing the tire.

To expand and contract the main section 1 there are the curved plates 8 secured to and fitting the inner periphery of the main section near its ends, these plates being detachably engageable by the expanding and contracting tool 9. This tool has the anchors 10 which have a dove-tailed engagement with the plates to prevent inward movement of the anchors from the plates. The lower faces of these anchors are arc-shaped, their radius of curvature being substantially the radius of curvature of the demountable rim. To retain the anchors in predetermined peripheral adjustment upon the plates, each of the latter has in one of its edges the transverse recess 11 which is engageable in by the end of a thumb screw 12 threadedly engaging an anchor. Each anchor has the bifurcations 13 which have transversely aligned apertures in which is journalled a pivot 14 threadedly engaged by one end of the rod 15. This rod has right and left handed threads at its ends so that upon rotation in one direction, the pivots and consequently the ends of the main section are spread apart while rotation in the opposite direction moves the same toward each other.

With the parts in place as shown in Figure 1, if it is desired to remove the tire the expanding and contracting tool 9 is applied by sliding its anchors 10 over the plates 8 until the transverse recesses 11 register with the thumb screws when the latter are tightened down. The threaded rod 15 is then rotated to expand the main section 1 sufficiently to permit of moving the filler section 2 radially inward. After the filler section 2 has been removed, the threaded rod is then rotated in the opposite direction to bring the ends of the main section adjacent to the air valve at which time the tire retaining rings 5 may be removed over the side flanges 4 as well as the tire. To apply the tire and replace the filler section, these operations are reversed.

From the above description it will be seen that the filler section is held in place without the necessity of an extra securing member. Furthermore, this filler section retains the demountable rim in fixed peripheral adjustment upon the fixed rim of the vehicle wheel.

What I claim as my invention is:

1. In a demountable rim, the combination with a transversely split main section having its ends adapted to be moved away from or toward each other, and plates secured to said ends having undercut sides for detachable engagement with an expanding and contracting tool, of a filler section insertable between said ends, the outer periphery of said filler section corresponding substantially to that of said main section, and the end bearing surfaces of said filler section and main section slightly diverging outwardly from lines passing through said end bearing surfaces and extending parallel to the radius of said rim passing through the peripheral center of said filler section.

2. In a demountable rim, the combination with a transversely split main section having its ends adapted to be moved away from or toward each other, and plates secured to said ends having undercut sides for detachable engagement with an expanding and contracting tool, of a filler section insertable between said ends, the outer periphery of said filler section corresponding substantially to that of said main section, and the end bearing surfaces of said filler section and main section being arranged to normally retain said filler section from radial inward movement relative to said main section, and means surrounding said main and filler sections and limiting the radial outward movement of said filler section relative to said main section.

In testimony whereof I affix my signature.

WILLIAM N. BOOTH.